United States Patent
Hwang

(10) Patent No.: US 9,860,242 B2
(45) Date of Patent: Jan. 2, 2018

(54) ONE-TIME ACCESS TO AN AUTOMATION SYSTEM

(71) Applicant: Vivint, Inc., Provo, UT (US)

(72) Inventor: Jungtaik Hwang, Draper, UT (US)

(73) Assignee: Vivint, Inc., Provo, UT (US)

( * ) Notice: Subject to any disclaimer, the term of this patent is extended or adjusted under 35 U.S.C. 154(b) by 260 days.

(21) Appl. No.: 14/456,771

(22) Filed: Aug. 11, 2014

(65) Prior Publication Data
US 2016/0044024 A1 Feb. 11, 2016

(51) Int. Cl.
G06F 7/04 (2006.01)
H04L 29/06 (2006.01)
H04L 29/08 (2006.01)

(52) U.S. Cl.
CPC .......... *H04L 63/0838* (2013.01); *H04L 67/02* (2013.01); *H04L 67/36* (2013.01)

(58) Field of Classification Search
CPC ...... H04L 63/0838; H04L 67/02; H04L 67/36
USPC .......................................................... 726/4–9
See application file for complete search history.

(56) References Cited

U.S. PATENT DOCUMENTS

| | | | | |
|---|---|---|---|---|
| 5,594,227 A * | 1/1997 | Deo | ..................... | G06Q 20/341 235/380 |
| 6,094,724 A * | 7/2000 | Benhammou | ........ | G06Q 20/105 705/41 |
| 6,360,254 B1 | 3/2002 | Linden et al. | | |
| 7,733,213 B2 † | 6/2010 | Levine | | |
| 7,933,410 B2 * | 4/2011 | Fahrny | ............. | H04N 21/26606 380/201 |
| 8,108,903 B2 * | 1/2012 | Norefors | ................. | G06F 21/35 455/410 |
| 2002/0087553 A1 | 7/2002 | Kitahara et al. | | |
| 2003/0061520 A1 * | 3/2003 | Zellers | ................. | H04L 63/083 726/5 |
| 2004/0015585 A1 | 1/2004 | McBrearty et al. | | |
| 2004/0059925 A1 * | 3/2004 | Benhammou | ....... | G06F 12/1458 713/189 |
| 2004/0215694 A1 † | 10/2004 | Podolsky | | |
| 2005/0177750 A1 * | 8/2005 | Gasparini | ............... | G06F 21/31 726/5 |
| 2006/0212452 A1 * | 9/2006 | Cornacchia, III | | ......................... G06F 17/30681 |

(Continued)

OTHER PUBLICATIONS

PCT International Search Report for International Application No. PCT/US2015/043720, dated Nov. 26, 2015 (3 pp.).

*Primary Examiner* — Thu Ha Nguyen
(74) *Attorney, Agent, or Firm* — Holland & Hart LLP

(57) ABSTRACT

Methods and systems are described for managing one-time access to an automation system. According to at least one embodiment, a computer-implemented method to grant a user access to an automation is described. The method may comprise receiving one or more access parameters to authorize one-time permission to the user to access the automation system. The method may further comprise granting one-time permission to the user to access the automation system based at least in part on the one or more access parameters. The method may additionally comprise generating a message comprising at least the one-time permission to access the automation system. The one or more access parameters may comprise at least one of a limited time frame, single use entry code, or a limited number of entries.

20 Claims, 6 Drawing Sheets

(56) References Cited

U.S. PATENT DOCUMENTS

| | | | | |
|---|---|---|---|---|
| 2007/0011083 A1* | 1/2007 | Bird | G06Q 40/025 | 705/38 |
| 2007/0186103 A1* | 8/2007 | Randle | G06F 21/31 | 713/168 |
| 2008/0119983 A1* | 5/2008 | Inbarajan | G07C 5/008 | 701/36 |
| 2008/0280644 A1* | 11/2008 | Hugot | H04L 63/0853 | 455/556.2 |
| 2009/0083851 A1* | 3/2009 | Michelle | G06F 21/31 | 726/21 |
| 2009/0256676 A1* | 10/2009 | Piccirillo | E05B 41/00 | 340/5.65 |
| 2009/0313687 A1* | 12/2009 | Popp | H04L 9/3228 | 726/9 |
| 2010/0042848 A1* | 2/2010 | Rosener | G06F 21/32 | 713/184 |
| 2010/0242097 A1 | 9/2010 | Hotes et al. | | |
| 2012/0084846 A1* | 4/2012 | Weis | G06F 21/34 | 726/6 |
| 2012/0323717 A1* | 12/2012 | Kirsch | G06Q 20/0855 | 705/26.1 |
| 2013/0049950 A1* | 2/2013 | Wohlert | H04M 11/04 | 340/531 |
| 2013/0151515 A1* | 6/2013 | Davis | G06Q 50/01 | 707/736 |
| 2013/0214902 A1* | 8/2013 | Pineau | G06F 21/32 | 340/5.61 |
| 2013/0318575 A1* | 11/2013 | Hart | H04L 9/3228 | 726/4 |
| 2013/0342314 A1* | 12/2013 | Chen | G07C 9/00309 | 340/5.65 |
| 2014/0002236 A1* | 1/2014 | Pineau | G06F 21/32 | 340/5.6 |
| 2014/0096215 A1* | 4/2014 | Hessler | H04L 63/0869 | 726/7 |
| 2014/0162598 A1* | 6/2014 | Villa-Real | H04M 1/66 | 455/411 |
| 2015/0267438 A1* | 9/2015 | Martinez | E05B 47/0001 | 70/278.1 |
| 2015/0269799 A1* | 9/2015 | Martinez | G07C 9/00182 | 70/277 |
| 2015/0302674 A1† | 10/2015 | Kuruba et al. | | |
| 2016/0241660 A1* | 8/2016 | Nhu | H04L 67/26 | |
| 2016/0261425 A1* | 9/2016 | Horton | G05B 15/02 | |
| 2016/0294572 A1* | 10/2016 | Shadid | G07C 9/00182 | |
| 2016/0337346 A1* | 11/2016 | Momchilov | G06F 21/34 | |

\* cited by examiner
† cited by third party

ONE-TIME ACCESS TO AN AUTOMATION SYSTEM

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business automation system. Adding new users or modifying users to automation systems can be cumbersome and time consuming.

SUMMARY

According to at least one embodiment, a computer-implemented method to grant a user access to an automation is described. The method may comprise receiving one or more access parameters to authorize one-time permission to the user to access the automation system. The method may further comprise granting one-time permission to the user to access the automation system based at least in part on the one or more access parameters. The method may additionally comprise generating a message comprising at least the one-time permission to access the automation system. The one or more access parameters may comprise at least one of a limited time frame, single use entry code, or a limited number of entries.

In some embodiments, a Uniform Resource Locator (URL) may be generated to grant the one-time permission, wherein the URL is sent to the user via at least one of a SMS, email, ping message, or social media message. A request to activate the URL may be received, wherein activating the URL grants the user access to the automation system. In further embodiments, a URL may be generated to send to the user, wherein the URL activates a webpage allowing the user to access the automation system. In some embodiments, an administrator of the automation system may be notified when the access has been executed.

In some embodiments, a request to grant access to the user for a predetermined time period may be received. The one time permission may be expired based at least in part on the predetermined time period independent of whether the access has been executed. Access to the automation system may be limited to a first zone. The first zone may comprise at least one of a door, room, series of rooms, or a combination thereof. In some embodiments, the automation system may be armed a predetermined time period after the permission has been redeemed. The one-time permission to access the automation system may expire after the access has been executed.

According to another embodiment, an apparatus to grant a user access to an automation system is also described. The apparatus may include a processor, a memory in electronic communication with the processor and instructions stored on the memory of the processor. The processor may execute the instructions to receive one or more access parameters to authorize one-time permission to the user to access the automation system and grant one-time permission to the user to access the automation system based at least in part on the one or more access parameters. The instructions may generate a message comprising at least the one-time permission to access the automation system.

According to another embodiment, a non-transitory computer-readable medium that may store instructions executable by a processor is also described. The instructions may receive one or more access parameters to authorize one-time permission to the user to access the automation system and grant one-time permission to the user to access the automation system based at least in part on the one or more access parameters. The instructions may generate a message comprising at least the one-time permission to access the automation system.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
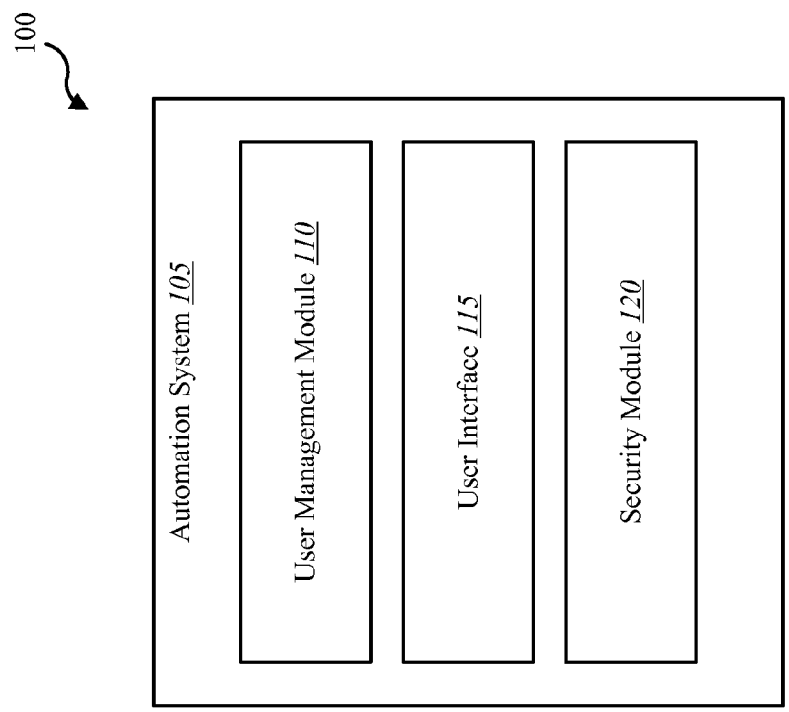
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to an improved user management system for automation systems. The user management system may grant limited access to inconsistent users of an automation system.

An automation system may have an owner, administrator or other authoritative figure (generally referred to herein as "administrator") of the system. The administrator may control the level of access to the automation system for different users. A user of an automation system may be a person with access to the automation system. A user profile may define the user's access to the system. Different users may have various levels of access. Administrators may control and manage the users and associated user profiles of the automation system and grant varying levels of access to one-time users of the automation system.

For example, in some embodiments, the administrator may not want to create a user profile for a person accessing the automation system a single time or inconsistently. For example, a person may need to access an automation system, but the access may be limited to a specific duration. Creating a user profile may be time consuming for a single instance user and the administrator may need to remember to delete the user after the access use is over. It may also not be possible to have a user present to allow the personnel access to either the automation system or the location where the automation system is present. Instead, it may be advantageous to enable personnel to access an automation system without the need to create a user profile or register with the automation system.

FIG. 1 is a block diagram illustrating one embodiment of an environment 100 in which the present systems and methods may be implemented. In some embodiments, the systems and methods described herein may be performed at least in part on or using an automation system 105. The environment 100 may include the automation system 105, a user management module 110, a user interface 115 and a security module 120.

User management module 110 may be configured to receive data related to managing user access to the automation system. In one example, managing a user may relate to creating, modifying, and/or deleting a user's access to the automation system. In some embodiments, managing a user may relate to managing a user profile. In further embodiments, managing a user may relate to managing a user's limited access to the automation system. The limited access may limit the extent of the user's access to the system, wherein the user may be unable to access certain zones or area of the location associated with the automation system. In further embodiments, the limited access may be a limited number of times a user is allowed to access the automation system and/or a limited duration of accessibility. The user management module 110 may enable the administrator to define pre-set defaults to assign to single-access users or may allow the administrator to customize the user access.

The user interface 115 may allow a user and/or administrator to interact with the automation system 105. The user interface 115 may facilitate communication between the user and the automation system 105. For example, in some embodiments, the automation system 105 may include a security system. The security system may be controlled via the security module 120. In some embodiments, a user may access the security module 120 and activate a security system via the user interface 115.

Figure 2:
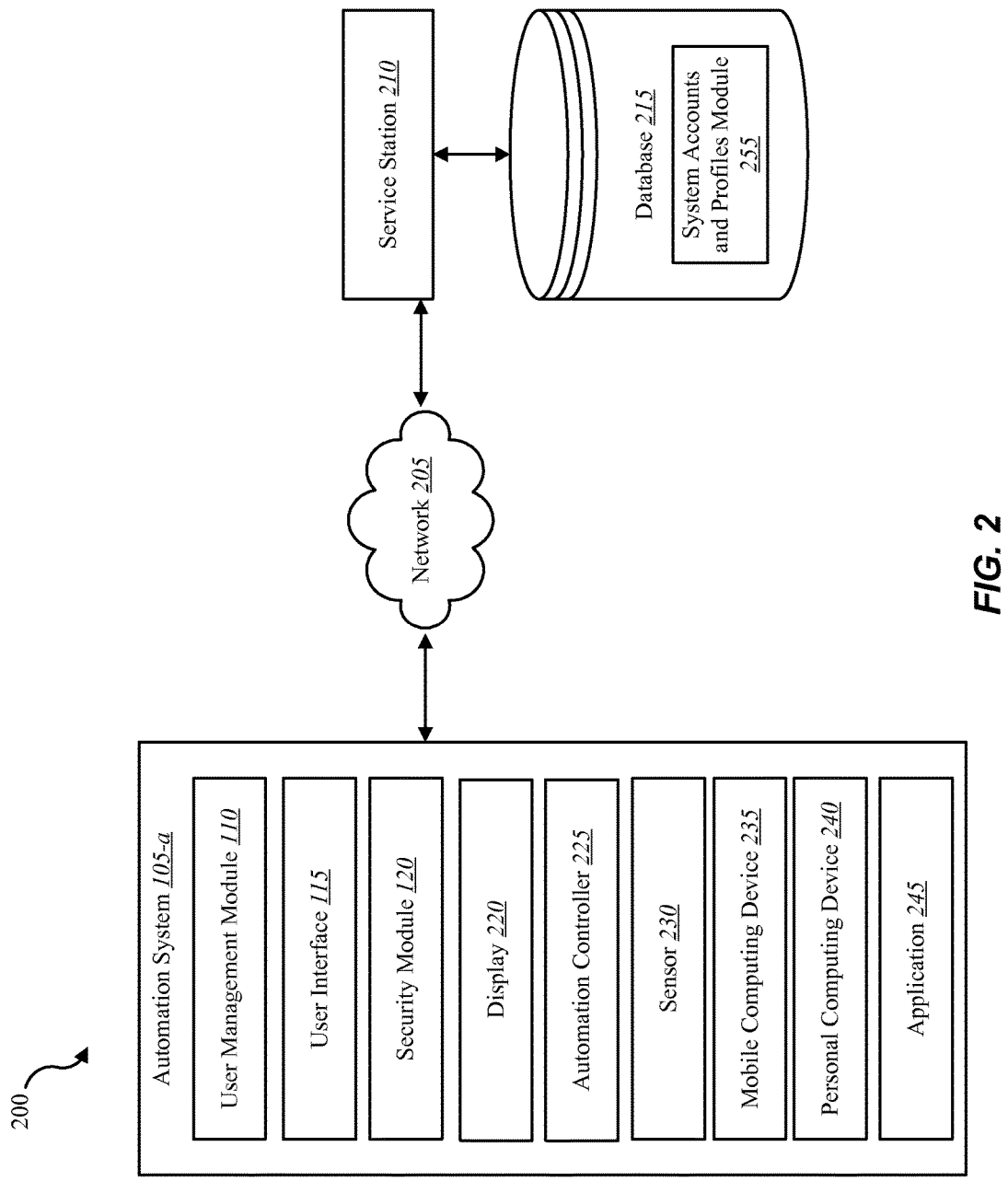
FIG. 2 is a block diagram of another environment in which the present systems and methods may be implemented.

Referring now to FIG. 2, in some embodiments, an environment 200 may include the components of the environment 100 described above, and may further include a network 205, a service station 210 and a database 215. Additionally, the environment 200 may include an automation system 105-a, which may be one example of the automation system 105 described above with reference to FIG. 1. The automation system 105-a may additionally include a display 220, an automation controller 225, a sensor 230, a mobile computing device 235, a personal computing device 240, and an application 245. The automation system 105-a may include various components and functionality that work cooperatively with the user management module 110 and the user interface 115, and/or may operate independently of the user management module 110 and the user interface 115.

The sensor 230 shown in FIG. 2 may represent one or more separate sensors or a combination of two or more sensors in a single sensor device. For example, the sensor 230 may represent one or more camera sensors and one or more motion sensors connected to the environment 200. Additionally, or alternatively, the sensor 230 may represent a combination sensor such as both a camera sensor and a motion sensor integrated in the same sensor device. Although the sensor 230 is depicted as connecting directly to the automation system 105-a, in some embodiments, the sensor 230 may connect to the automation system 105-a over network 205. Additionally, or alternatively, the sensor 230 may be integrated with a home appliance or fixture such as a light bulb fixture. The sensor 230 may include an accelerometer to enable the sensor 230 to detect a movement. The sensor 230 may include a wireless communication device enabling the sensor 230 to send and receive data and/or information to and from one or more devices in the environment 200. Additionally, or alternatively, the sensor 230 may include a GPS sensor to enable tracking a location of the sensor 230. The sensor 230 may include a proximity sensor to enable the sensor 230 to detect a proximity of a person relative to a predetermined distance from a dwelling (e.g., geo-fencing). The sensor 230 may include one or more security detection sensors such as, for example, a glass break sensor, a motion detection sensor, or both. Additionally, or alternatively, the sensor 230 may include a smoke detection sensor, a carbon monoxide sensor, or both.

In some embodiments, the mobile computing device 235 may include one or more processors, one or more memory devices, and/or a storage device. Examples of the mobile computing device 235 may include mobile phones, smart phones, tablets, personal digital assistants (PDAs), wearable computers, ultra-mobile PCs, etc. Although the mobile computing device 235 is depicted as connecting directly to the automation system 105-a, in some embodiments, the mobile computing device 235 may connect to the automation system 105-a over the network 205. Additionally, the mobile computing device 235 may represent a single mobile computing device or multiple mobile computing devices that may access the automation system 105-a.

In some embodiments, the personal computing device 240 may include one or more processors, one or more memory devices, and/or a storage device. Examples of the personal computing device 240 may include a viewing device associated with a media content set top box, satellite set top box, cable set top box, DVRs, personal video recorders (PVRs), mobile computing devices, computers, servers, etc. Although the personal computing device 240 is depicted as connecting directly to the automation system 105-a, in some embodiments, the personal computing device 240 may connect to the automation system 105-a over the network 205. Additionally, the personal computing device 240 may represent a single mobile computing device or multiple mobile computing devices that may access the automation system 105-a.

In some embodiments, a user may access the functions of automation system 105-a from either the mobile computing device 235 or the personal computing device 240. For example, in some embodiments, the user may have a user profile associated with the automation system 105-a and may access the system via the mobile computing device 235 or the personal computing device 240. In further embodiments, the user may have been granted limited accessibility to the automation system 105-a without generating a user profile. The user may access the automation system 105-a using their personal computing device 240 and/or mobile computing device 235 without a user profile associated with the automation system 105-a. In some embodiments, the mobile computing device 235 and/or the personal computing device 240 may include a mobile application interfacing with one or more functions of the automation system 105-a, and the service station 210.

Examples of the automation controller 225 may include a dedicated automation computing device. Examples of a dedicated computing device may include a wall-mounted controller, a remote control, a voice activated controller, and the like. In some embodiments, the automation controller 225 may control aspects of a property as well as receive and display notifications regarding monitored activity of a property.

In some embodiments, the application 245 may allow a user to control (either directly or via automation controller 225) an aspect of the monitored property based on the user accessibility permissions, including security, energy management, locking or unlocking a door, checking the status of a door, locating a person or item, controlling lighting, thermostat, cameras, receiving notification regarding a current status or anomaly associated with a home, office, place of business, and the like. In some configurations, the application 245 may enable the automation system 105-a to interface with the automation controller 225 and enable the user interface 115 to display automation, security, and/or user management content on the display 220, the mobile computing device 235 and/or the personal computing device 240. Further, the application 245 may be installed on the mobile computing device 235 and/or on the personal computing device 240 to allow a user to interface with the automation system 105-a and the service station 210.

In some embodiments, the automation system 105-a may communicate with the service station 210 via the network 205. Examples of the network 205 include cloud networks, local area networks (LAN), wide area networks (WAN), virtual private networks (VPN), wireless networks (using 802.11, for example), and/or cellular networks (using 3G and/or LTE, for example), etc. The network 205 may be a single network, or may include multiple interconnected, overlapping, or coincidental networks. For example, in some embodiments, the network 205 may include multiple networks interconnected to facilitate communication or may include redundant networks. For example, the network 205 may represent a first network (e.g., the Internet) and a second network (e.g., cellular networks).

The service station 210 shown in FIG. 2 may represent one or more separate service stations or a combination service stations. The service station 210 may be a network operations center, a monitoring center, a service station or any similar station in association with the automation system service provider. In some embodiments, the service station 210 may perform various and/or all aspects of the user management module 110.

In some embodiments, the service station 210 may be coupled to the database 215. The database 215 may include, for example, system accounts and profiles associated with each automation system 105-a monitored by the service station 210. For example, the database 215 may include a system account and profile module 255 which may store the user accounts and profiles associated with each automation system 105-a. The user accounts and profiles may also store information regarding one-time use or inconsistent users of the automation system 105-a. The database 215 may include other information including, for example, historical information about the automation system 105-a and other aspects of environment 200, contact information for various response personnel, and the like.

Figure 3:
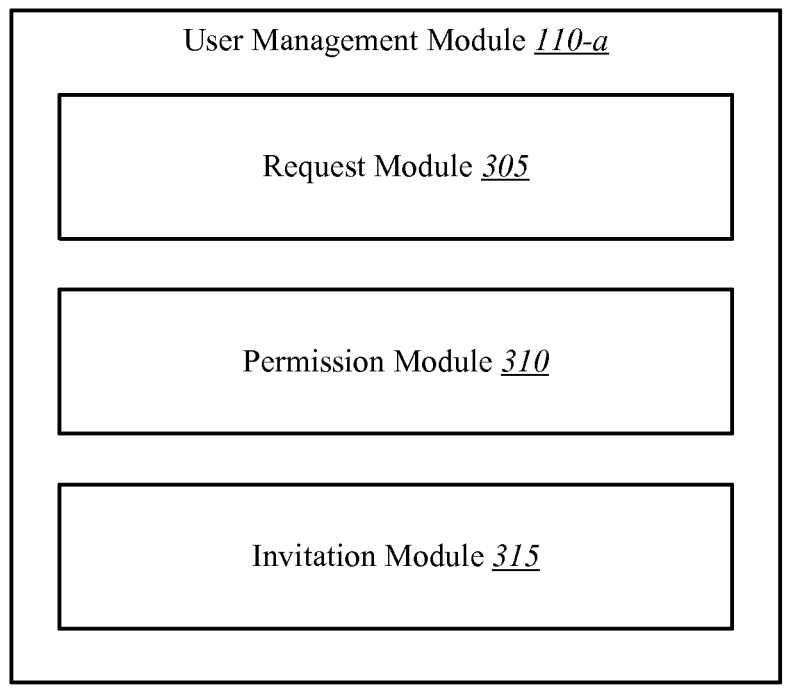
FIG. 3 is a block diagram of an example user management module of the environments shown in FIGS. 1 and 2.

FIG. 3 is a block diagram 300 illustrating one example of a user management module 110-a. The user management module 110-a may be one example of the user management module 110 depicted in FIGS. 1 and/or 2. As depicted, the user management module 110-a may include a request module 305, a permission module 310, and an invitation module 315. The user management module 110-a may include additional modules and capabilities in other embodiments. Similarly, the user management module 110-a may include fewer number of modules and functionality than that which is described with reference to FIG. 3. The user management module 110-a may allow an administrator of an automation system to enable a user one-time access to the automation system without requiring the user to register with the automation system.

In some embodiments, the request module 305 may allow an administrator to manage requests for access to the automation system. The requests may be requests for a user profile or may be single access requests. The requests may be self-generated by the administrator or may be requests received from other users of the automation system and/or personnel external to the automation system. Single access requests may be generated and processed when personnel need to access the automation system for a limited duration. For example, a delivery person may need to put a package inside a home. Cleaning personnel or pet care takers may need to enter a home or business. The administrator may not wish for those personnel to have permanent profiles. A repair personnel may need access to a location or the like.

The request module 305 may first receive a request to permit one time access for a user. The one-time access may be a single access to the automation system, unlimited access during a predetermined time frame, a limited number of accesses, or the like. The single access may be defined by the personnel accessing the house and the reason the personnel needs to access the house. For example, a mailman may need to open a front door and put a package inside the house. The mailman could be limited to a single use. In another embodiment, movers may need to enter and exit the location numerous times during a predetermined time frame. Likewise, a repair person may need to open a door twice, once to enter and once to exit the premises. In other embodiments, the repair personnel may enter and exit the house numerous times to retrieve proper equipment and the like from a supply vehicle. The request to permit one-time access may include defaults and/or further definition for these access parameters.

The request module 305 may receive contact information for the user. For example, when the administrator is generating the single use request, the administrator may enter identifying information concerning the user. The identifying information may include a first and last name, a company association, a brief description, and contact information. The company association may be the name of the moving company, cleaning company, furniture store, or the like. The brief description may outline and describe the user for later reference by the administrator. This may enable the administrator to quickly refresh their memory when reviewing access logs, etc. The contact information may be an email address, phone number, SMS number, or the like. In some embodiments, the administrator may wish to retain the one-time user information for future reference. For example, the administrator may wish to retain and easily reenter information for a mailman making a delivery. Rather than granting the mailman a user profile, the administrator may save the information and grant one-time access every time a need exists.

The permission module 310 may define the permissions to be granted to the user. For example, the permission module 310 may define who has access, the duration of the access, the zone access is granted to, when the access expires, total number of access rights granted and the like. For example, access may be granted generally to a company, or to a specific personnel associated with the company. The duration of the access may be set by the administrator and may be determined for each user requiring one time access. For example, a mail delivery may have a smaller delivery window than a repair personnel. In some embodiments, the personnel may need to access different areas of the property. For example, in some embodiments, a mailman may need to simply drop a package off in the foyer. The permission granted to the mailman may only deactivate and unlock a front door and any motion sensors in the entry way. In other embodiments, cleaning personnel may need access to the entire house. In those embodiments, the entire automation system may be deactivated for a longer period of time. Additionally, in a commercial embodiment, personnel may only need access to limited areas of the commercial location. For example, a repair personnel may only need access to the kitchen to repair a broken appliance. In those situations, the access may be limited to specific zones. In some embodiments, access may be limited to a first zone or multiple zones. The permissions may be defined by an administrator or may be default settings.

In some embodiments, the permission module 310 may comprise a series of defaults. For example, the permission module 310 may default to a single access grant available during a predetermined time frame and expiring a predetermined time period after the permission is granted. In some embodiments, the automation system may control the defaults. In further embodiments, the administrator may alter and/or determine the defaults. In still further embodiments, the administrator may link a single access user to the administrator's calendar. For example, the administrator may be aware of a furniture delivery pending within the week. The administrator may immediately program the single access grant. The program may include linking the permission to the administrator's calendar wherein the permission may be activated and sent to the user at predetermined time period prior to the permission time frame. For example, the permission may be scheduled to send to the personnel ten minutes before the necessary scheduled time frame.

In some embodiments, the permission module 310 may determine when the automation system should be reactivated. For example, when the user accesses the location, at least a portion of the automation system is deactivated to allow the user access. Depending upon the type of personnel and reasons for access, the automation system may automatically activate after a period of time. For example, in the case of a mail delivery, the automation system may arm immediately after the door is closed. In further embodiments, the automation system may arm after a predetermined time period. For example, ten minutes after the door is opened. In some embodiments, the automation system may reactive a set time period after activity has ceased. For example, the automation system may include a series of sensors. The sensors may track movement such as motion sensors or door sensors. The automation system may determine that the sensors have not detected any motion in approximately thirty minutes and may therefore activate the automation system. In some embodiments, activating the automation system may comprise activating a security system.

In some embodiments, the permission module 310 may determine when the permission should expire. For example, the administrator may not wish to have one-time access remain active. In some instances, the user may not access the automation system during the predetermined time frame. The user may have been delayed, the reason for the visit may have been cancelled or rescheduled, the user may have forgotten, and the like. The user may be able to access the automation at a different time than intended because the permission may remain open and active. However, in some embodiments, the administrator and/or the automation system may determine when the permission should expire. For example, the automation system may have a default requiring the permission to expire after the access window has passed. In those embodiments, even if a delivery personnel is less than one minute late, the automation system may not allow the user to access the system.

The invitation module 315 may gather all of the access information from the permission module 310 and generate a permission invitation to send to the user. For example, the invitation module 315 may gather the access information and generate a uniform resource locator (URL) to send to the user. The URL may outline the access parameters and define the user's ability to access the automation system. The URL may be sent to the user via an SMS, phone call, email, social media message, ping message, voice message, and the like. In some embodiments, activating the URL may automatically activate immediate access to the automation system. For example, the URL may immediately disable and/or unlock certain access points to the location associated with the automation system. This may occur immediately when the user activates the URL.

In further embodiments, activating the URL may direct the user to a web page. The web page may include another URL which may need to be activated to grant access to the location. By redirecting the user to a webpage to unlock the location, the web page may prevent a user from accidently activating permission. Instead of automatically accessing the location, the URL allows the user to confirm their desire to unlock and access the location associated with the automation system.

The invitation module 315 may track the permission grant and determine when the permission has been activated. Once the permission has been activated and a user has access the location, the administrator may receive a notification of such. In some embodiments, the administrator may view the personnel through a streaming video if video sensors are present at the location. In further embodiments, the invitation module 315 may send a notification to the administrator when the system has been rearmed after a visit from the user.

Figure 4:
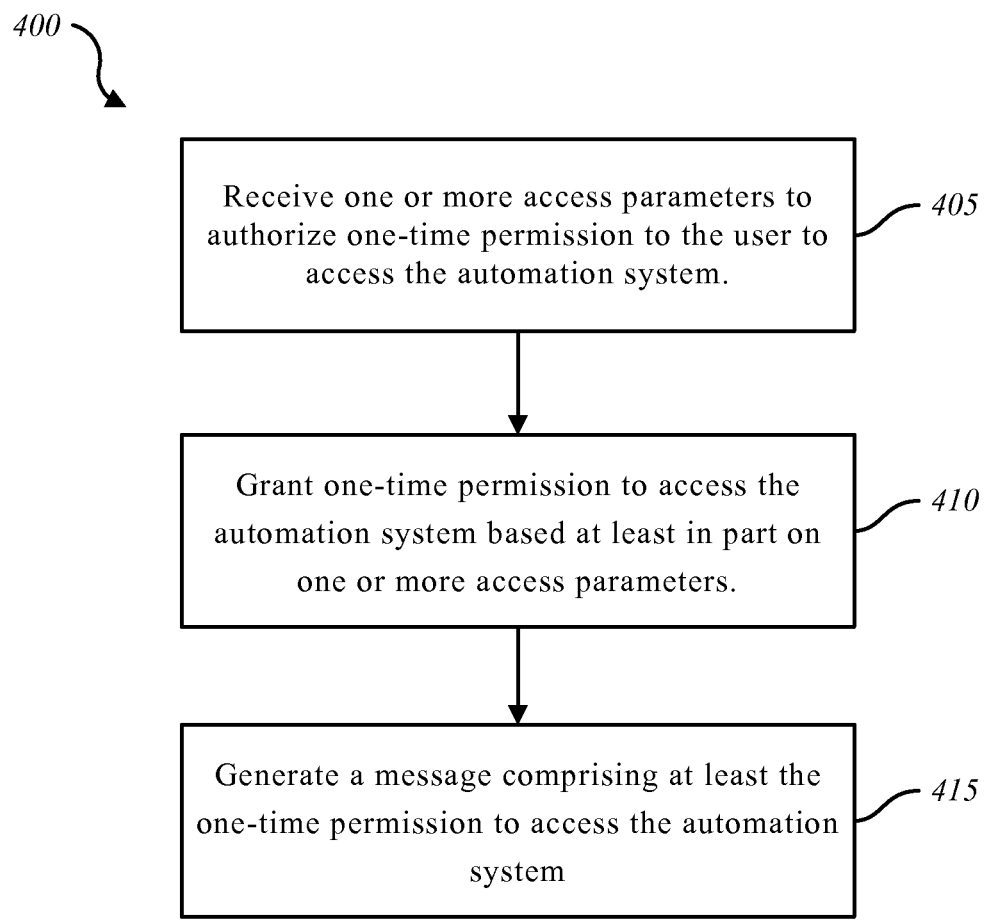
FIG. 4 is a flow diagram illustrating an exemplary method for granting access to an automation system.

FIG. 4 is a flow diagram illustrating one embodiment of a method 400 for adding a one-time access to an automation system. In some configurations, the method 400 may be implemented in whole or in part by the user management module 110 of the automation system 105 shown in FIGS. 1 and/or 2. In further embodiments, the method 400 may be performed generally by the automation system 105 shown in FIGS. 1 and/or 2, or even more generally by the environments 100, 200 shown in FIGS. 1 and/or 2.

At block 405, one or more access parameters may be received to authorize a user one-time permission to access the automation system. The one or more access parameters may comprise at least one of a limited time frame, limited number of entries, single use entry or combination thereof. The limited time frame may be a predetermined time frame in which the user may access the automation system. In some embodiments, the user may be limited to accessing the automation a predetermined number of times. In some embodiments, the user may be granted one-time permission to access the automation system a predetermined number of times over a predetermined time period. In further embodiments, the one or more access parameters may comprise one or more zones the user may be granted access to. For example, the user may be granted access to a single door, a series of doors, a garage door, or a particular room or rooms. The parameters may be defined by the location of the automation system. For example, the location may be a commercial location or a residential location. The parameters may further be defined by the purpose of the access. In some embodiments, an administrator of the automation system may generate a requesting including at least the one or more access parameters to grant the user one-time access to the automation system.

At block 410, the user may be granted one-time permission to access the automation system based at least in part on one or more access parameters. The access parameters may comprise at least one of a limited time frame, single use entry code, limited number of entries, and the like. The permission may deactivate the automation system allowing the user to access the location. The permission may also unlock one or more doors to allow the user to access the location and/or zones within the location. At block 415, a message may be generated to send to the user based on the contact information. The message may be one of an SMS message, voice message, email, social media message or the like. The message may include one-time permission to access the automation system. The permission may in the form of a URL, access code, biometric identifier, or the like.

Figure 5:
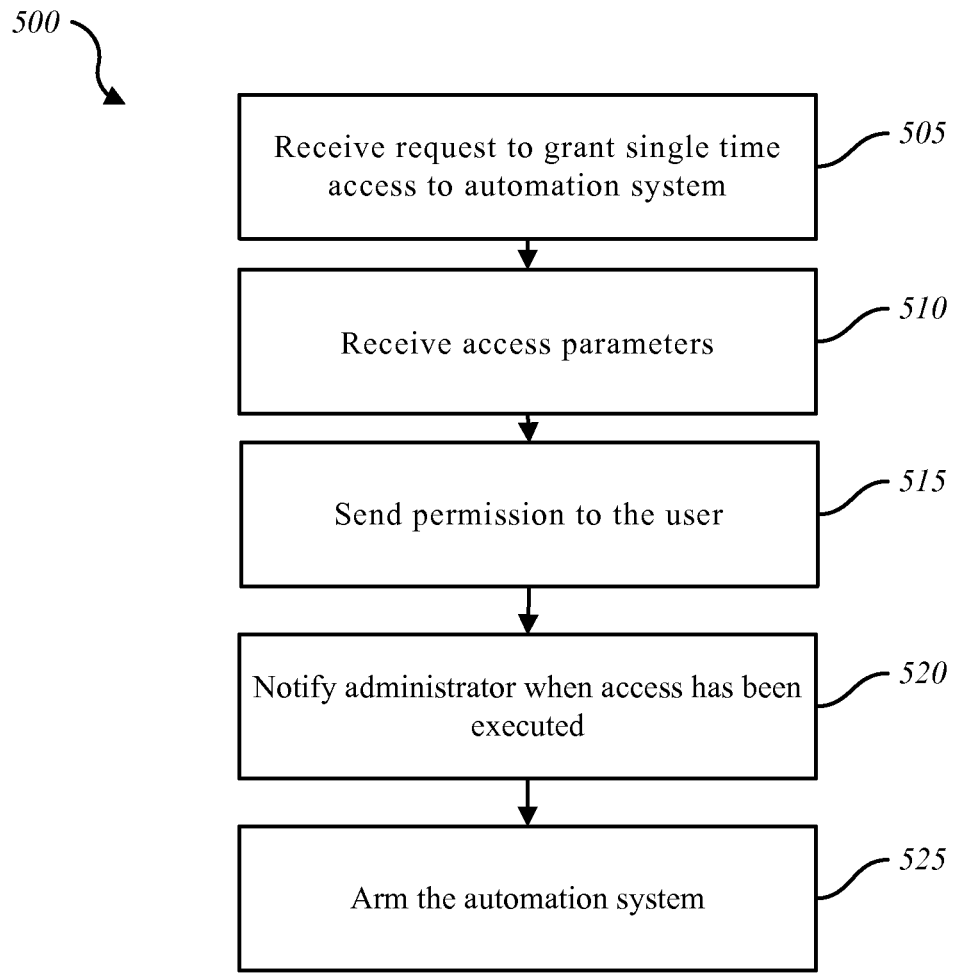
FIG. 5 is another flow diagram illustrating another exemplary method for granting access to an automation system.

FIG. 5 is a flow diagram illustrating one embodiment of a method 500 for permitting a user one time access to an automation system. In some configurations, the method 500 may be implemented in whole or in part by the user management module 110 of the automation system 105 shown in FIGS. 1 and 2. In further configurations, the method 500 may be performed generally by the automation system 105 shown in FIGS. 1 and/or 2, or even more generally by the environments 100, 200 shown in FIGS. 1 and/or 2.

At block 505, a request to grant one-time access to an automation system may be received. The request may be generated by an administrator of the automation system. The request may also be generated by a user of the automation system and sent to the administrator for approval. The request may be generated from an automation controller (e.g. automation controller 225), mobile computing device (e.g. mobile computing device 235), and/or a personal computing device (e.g. personal computing device 240). The request may include information regarding a user. For example, the administrator may wish to grant the user one-time access to the automation system. The one-time access may be a predetermined amount of time, number of entries, or the like. The information included within the request may outline a first and last name for the user, company associated with the user, notes on reasons for access, and/or contact information.

At block 510, one or more access parameters for the user may be received. The one or more access parameters may comprise duration the permission is viable, number of entries allowed, zones to access, date and time of access, and the like. The one or more access parameters may comprise a series of parameters. For example, a user may be granted three entries to a location during a two hour window on a specific day of the week. The access parameters may further comprise expiration information. For example, the permission may expire after the permission is redeemed. In some instances, the user may not redeem their access. For example, the reason to access the automation system may have been cancelled, rescheduled or the like. Or in some instances, the user may have been delayed and unable to fulfill their responsibilities. In those instances, the administrator may set a time frame in which the permission is valid. Once the time period has lapsed, the user will no longer have permission to access the automation system.

At block 515, permission may be sent to the user. The permission may be sent in the form of a URL. For example, the access parameters may be compiled within an invitation in the form of a URL, access code, or the like. In some embodiments, the permission may be sent to the user via one of a SMS message, voice message, email, social media message, or the like.

The URL may be generated by the automation system (e.g. automation system 105) or by a service station (e.g. service station 210). The URL may be programmed to communicate the level and type of access to the automation system 105 when activated. For example, the URL may communicate with an automation controller (e.g. automation controller 225) when the URL is activated.

Activating the URL may comprise the user selecting the URL link. Selecting the URL link may either send a direct communication to the automation system. In another embodiment, selecting the URL link may open a web page. The web page may include further information on how to activate the permissions to access the automation system. In some embodiments, the web page may include another URL which may activate the automation system.

At block 520, the administrator may be notified when access has been executed. For example, the automation system 105 may recognize when the one time access request has been redeemed or when the user has accessed the automation system. The administrator may receive an alert that the event occurred. The alert may be a phone call, SMS message, voice message, email, social media post, and the like. In some embodiments, the message may include information regarding the access. For example, the notification may alert the administrator as to who accessed the automation system, when the access was redeemed and how long the access was active for. In further embodiments, the notification may include images or video of the user and the purpose of their visit. For example, the notification may include the mail man's information and a picture of a package delivered in the foyer of a home. The notification may also include images of a furnace repairman working on the furnace. In some embodiments, if the user has violated access parameters, the administrator may receive additional alerts.

For example, in some embodiments, if the request was redeemed or attempted to be redeemed outside the access parameters, the administrator may receive a notification. The administrator may review the request and determine to grant access to the automation system even though the access parameters have been violated. In further embodiments, the user may have ventured into zones where permission was not granted. For example, a mailman may have entered into the kitchen rather than remaining in the foyer. The administrator may receive this alert. The alert may include photographic information regarding the access parameter violation. For example, the mailman may have simply placed the package on the kitchen table rather than leaving it in the foyer. A video or photograph of this may be relayed to the administrator. Similarly, a repair personnel may have needed to use the lavatory or retrieved a drink of water from the kitchen, or washed their hands. In some instances, the user may have violated the access parameters due to a lack of knowledge of the automation system. In further instances, the user may have violated the access parameters for unethical reasons such as larceny, vandalism, or the like. The administrator may review the user's access to their location, either commercial or residential, and determine the user's presence as the site. If necessary, the administrator may use the automation to contact proper personnel. In some embodiments, the administrator may wish to contact authorities to take action.

At block 525, the automation system may arm itself after the permission to access the automation system has been executed. The automation system may default to rearm itself a predetermined time period after the permission has been executed. In other embodiments, the administrator may determine when the automation system should rearm itself. For example, a mailman making a delivery does not need the home to be unarmed for a long period of time. However, a repairman may need a longer period of time to access the location to perform their duties. Similarly, cleaning personnel or contractors may require a longer time period to access the location. The administrator may set these requirements when the user request is submitted to the automation system. In further embodiments, the user may contact the administrator and ask for a longer period of time and the administrator may remotely change the rearming time period to allow more time for the user.

In further embodiments, the administrator may allow the user to arm the system when their job is complete. For example, the administrator may send the user permission to access the automation system. The permission may be in a message. The message may also include permission to arm the system. In some embodiments, permission to arm the system may be sent in an additional message. The permission may be a URL to activate the automation system or may be a code to enter to arm the automation system.

Figure 6:
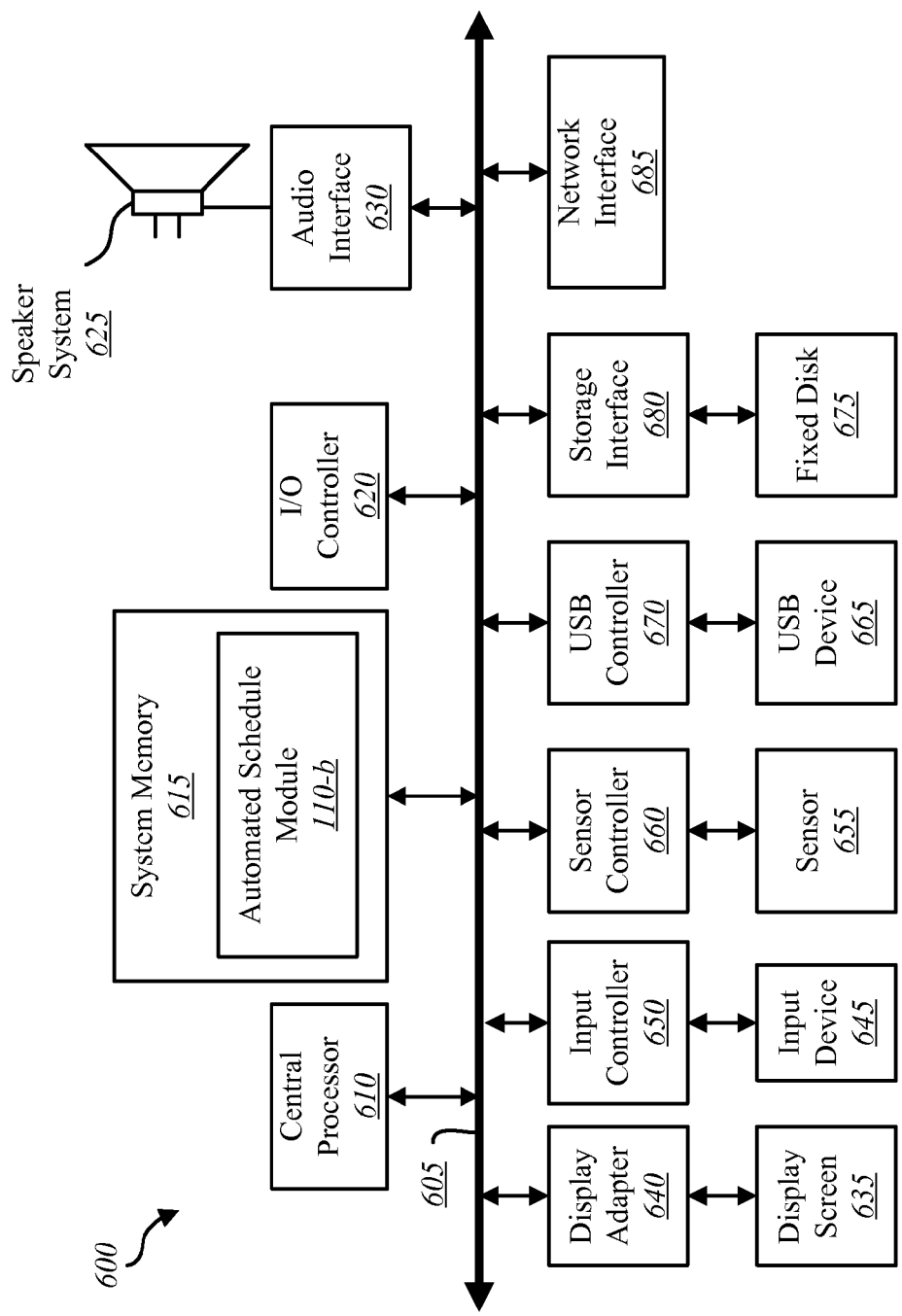
FIG. 6 is a block diagram of a computer system suitable for implementing the present systems and methods of FIGS. 1-5.

FIG. 6 depicts a block diagram of a controller 600 suitable for implementing the present systems and methods. The controller 600 may be an example of the automation controller 225, the personal computing device 240, and/or the mobile computing device 235 illustrated in FIG. 2. In one configuration, the controller 600 may include a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can include, among other code, the Basic Input-Output system (BIOS) which controls basic hardware operation such as the interaction with peripheral components or devices. For example, a user management module 110-b to implement the present systems and methods may be stored within the system memory 615. The user management module 110-b may be an example of the user management module 110 illustrated in FIGS. 1, 2, and/or 3. Applications (e.g., application 245) resident with controller 600 are generally stored on and accessed via a non-transitory computer readable medium, such as a hard disk drive (e.g., fixed disk drive 675) or other storage medium. Additionally, applications can be in the form of electronic signals modulated in accordance with the application and data communication technology when accessed via the network interface 685.

Storage interface 680, as with the other storage interfaces of controller 600, can connect to a standard computer readable medium for storage and/or retrieval of information, such as a fixed disk drive 675. The fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS®, ANDROID®, MS-DOS®, MS-WINDOWS®, OS/2®, UNIX®, LINUX® or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method to grant a user access to an automation system of a premises, comprising:
   receiving, by a controller of the automation system, a request to grant a non-occupant one-time permission to access the premises while an occupant is not present at the premises, the occupant of the premises comprising an owner or administrator of the automation system and the non-occupant comprising personnel external to the premises and automation system;
   receiving, by the controller, information including a type of personnel associated with the non-occupant in the request relative to the one-time permission to access the premises;
   determining, by the controller, a zone of the premises and an access duration to the zone for the non-occupant based at least in part on the type of personnel associated with the non-occupant;
   generating, by the controller, a Uniform Resource Locator (URL) to grant the one-time permission, the URL including a single use entry code to the premises and an indication of access to the zone of the premises and the access duration;
   granting, by the controller, the non-occupant the one-time permission to access the zone of the premises based at least in part on the URL; and
   transmitting, by the controller, a message comprising the URL to the non-occupant to access the zone of the premises.

2. The computer-implemented method of claim 1, wherein the indication of access further comprises a limited number of entries.

3. The computer-implemented method of claim 1, wherein the URL is sent to the non-occupant via at least one of a SMS, email, ping message, or social media message.

4. The computer-implemented method of claim 3, further comprising:
   receiving a request to activate the URL, wherein activating the URL grants the non-occupant access to the premises.

5. The computer-implemented method of claim 1, further comprising:
   generating the URL to send to the non-occupant, wherein the URL activates a webpage allowing the non-occupant to access the premises.

6. The computer-implemented method of claim 1, further comprising:

notifying an administrator of the automation system when the access has been executed.

7. The computer-implemented method of claim 1, further comprising:
receiving a request to grant the access to the non-occupant for a predetermined time period.

8. The computer-implemented method of claim 7, further comprising:
expiring the one-time permission based at least in part on the predetermined time period independent of whether the access has been executed.

9. The computer-implemented method of claim 8, wherein the first zone is at least one of a door, room, series of rooms, or a combination thereof.

10. The computer-implemented method of claim 1, furthering comprising:
limiting the access to the premises to a first zone.

11. The computer-implemented method of claim 1, further comprising:
arming the automation system a predetermined time period after the one-time permission has been redeemed.

12. The computer-implemented method of claim 1, further comprising:
expiring the one-time permission to access the premises after the access has been executed.

13. An apparatus to grant a user access to an automation system of a premises, comprising:
a processor of a controller of the automation system;
a memory in electronic communication with the processor; and
instructions stored in the memory, the instructions being executable by the processor to:
receive a request to grant a non-occupant one-time permission to access the premises while an occupant is not present at the premises, the occupant of the premises comprising an owner or administrator of the automation system and the non-occupant comprising personnel external to the premises and automation system;
receive information including a type of personnel associated with the non-occupant in the request relative to the one-time permission to access the premises;
determine a zone of the premises and an access duration to the zone for the non-occupant based at least in part on the type of personnel associated with the non-occupant;
generate a Uniform Resource Locator (URL) to grant the one-time permission, the URL including a single use entry code to the premises and an indication of access to the zone of the premises and the access duration;
grant the non-occupant the one-time permission to access the zone of the premises based at least in part on the URL; and
transmit a message comprising the URL to the non-occupant to access the zone of the premises.

14. The apparatus of claim 13, wherein the indication of access further comprises a limited number of entries.

15. The computer-implemented method of claim 14, wherein the instructions are executable by the processor to:
expire the one-time permission based at least in part on a predetermined durational time period independent of whether the access has been executed.

16. The apparatus of claim 13, wherein the instructions are executable by the processor to:
notify an administrator of the automation system when the access has been executed.

17. The apparatus of claim 13, wherein the instructions are executable by the processor to:
arm the automation system a predetermined time period after the permission has been redeemed.

18. A non-transitory computer-readable medium storing instructions executable by a processor of a controller of an automation system to:
receive a request to grant a non-occupant one-time permission to access the premises while an occupant is not present at the premises, the occupant of the premises comprising an owner or administrator of the automation system and the non-occupant comprising personnel external to the premises and automation system;
receive information including a type of personnel associated with the non-occupant in the request relative to the one-time permission to access the premises;
determine a zone of the premises and an access duration to the zone for the non-occupant based at least in part on the type of personnel associated with the non-occupant'
generate a Uniform Resource Locator (URL) to grant the one-time permission, the URL including a single use entry code to the premises and an indication of access to the zone of the premises and the access duration;
grant the non-occupant the one-time permission to access the zone of the premises based at least in part on the URL; and
transmit a message comprising the URL to the non-occupant to access the zone of the premises.

19. The computer-readable medium of claim 18, wherein the instructions are executable by the processor to:
expire the one-time permission based at least in part on a predetermined durational time period independent of whether the access has been executed.

20. The computer-readable medium of claim 19, wherein the instructions are executable by the processor to:
arm the automation system a predetermined time period after the permission has been executed.

* * * * *